United States Patent
Bittar et al.

(10) Patent No.: US 11,674,378 B2
(45) Date of Patent: Jun. 13, 2023

(54) DOWNHOLE RANGING USING 3D MAGNETIC FIELD AND 3D GRADIENT FIELD MEASUREMENTS

(71) Applicant: Halliburton Energy Services, Inc., Houston, TX (US)

(72) Inventors: Michael Bittar, Houston, TX (US); Hsu-Hsiang Wu, Sugar Land, TX (US); Yijing Fan, Singapore (SG)

(73) Assignee: Halliburton Energy Services, Inc., Houston, TX (US)

( * ) Notice: Subject to any disclaimer, the term of this patent is extended or adjusted under 35 U.S.C. 154(b) by 107 days.

(21) Appl. No.: 17/295,751

(22) PCT Filed: Jan. 10, 2019

(86) PCT No.: PCT/US2019/013039
§ 371 (c)(1),
(2) Date: May 20, 2021

(87) PCT Pub. No.: WO2020/145975
PCT Pub. Date: Jul. 16, 2020

(65) Prior Publication Data
US 2022/0018244 A1    Jan. 20, 2022

(51) Int. Cl.
*E21B 47/0228*   (2012.01)
*E21B 43/24*     (2006.01)
*G01V 3/12*      (2006.01)
*E21B 7/04*      (2006.01)

(52) U.S. Cl.
CPC ...... *E21B 47/0228* (2020.05); *E21B 43/2406* (2013.01); *G01V 3/12* (2013.01); *E21B 7/04* (2013.01); *E21B 2200/20* (2020.05)

(58) Field of Classification Search
None
See application file for complete search history.

(56) References Cited

U.S. PATENT DOCUMENTS

| 8,618,803 B2 | 12/2013 | Rodney et al. |
| 2002/0075001 A1 | 6/2002 | Goodman |
| 2007/0012483 A1* | 1/2007 | Self .................... E21B 47/0232 175/45 |
| 2007/0278008 A1 | 12/2007 | Kuckes et al. |
| 2008/0275648 A1* | 11/2008 | Illfelder ................ E21B 47/022 702/10 |

(Continued)

FOREIGN PATENT DOCUMENTS

| WO | WO 2009/128989 A1 | 10/2009 |
| WO | WO 2016/025232 A1 | 2/2016 |

OTHER PUBLICATIONS

International Search Report and the Written Opinion of the International Search Authority, or the Declaration, dated Sep. 4, 2020, PCT/US2019/013039, 15 pages, ISA/KR.

(Continued)

*Primary Examiner* — Douglas X Rodriguez
(74) *Attorney, Agent, or Firm* — Benjamin Ford; C. Tumey Law Group PLLC

(57) ABSTRACT

A ranging system and method uses three-dimensional ("3D") magnetic field measurements to correct ranging distance and direction. Ghost well interference may also be decoupled from the ranging solutions using 3D magnetic gradient field measurements.

20 Claims, 11 Drawing Sheets

(56) References Cited

U.S. PATENT DOCUMENTS

| | | |
|---|---|---|
| 2009/0095530 A1 | 4/2009 | Waters et al. |
| 2009/0120691 A1 | 5/2009 | Waters et al. |
| 2016/0273337 A1 | 9/2016 | Donderici et al. |
| 2016/0273340 A1* | 9/2016 | Roberson .............. G01V 99/005 |
| 2017/0074087 A1 | 3/2017 | Donderici et al. |
| 2017/0138173 A1* | 5/2017 | Estes ..................... E21B 47/092 |

OTHER PUBLICATIONS

Extended Search Report issued for European Patent Application No. 19909283.4, dated Jul. 18, 2022, 10 pages.

\* cited by examiner

DOWNHOLE RANGING USING 3D MAGNETIC FIELD AND 3D GRADIENT FIELD MEASUREMENTS

PRIORITY

The present application is a U.S. National Stage patent application of International Patent Application No. PCT/US2019/013039, filed on Jan. 10, 2019, the benefit of which is claimed and the disclosure of which is incorporated herein by reference in its entirety.

FIELD OF THE DISCLOSURE

The present disclosure relates generally to downhole ranging and, more specifically, to magnetic ranging methods and systems that use three-dimensional ("3D") magnetic field measurements and 3D gradient field measurements to correct ranging between wellbores.

BACKGROUND

As the easy-to-access and easy-to-produce hydrocarbon resources depleted over the last century, more and more difficult wells remain. Moreover, as the world's hydrocarbon demand is continuously growing, meeting this demand requires development of more advanced recovery procedures. One such procedure is Steam Assisted Gravity Drainage ("SAGD"), a procedure that utilizes steam in conjunction with two spaced apart wellbores. Specifically, SAGD addresses the mobility problem of heavy oil in a formation through the injection of high pressure, high temperature steam into the formation. This high pressure, high temperature steam reduces the viscosity of the heavy oil in order to enhance extraction. The injection of steam into the formation occurs from an injector wellbore that is drilled above and parallel to another producer wellbore.

As the viscosity of the heavy oil in the formation around the injector wellbore is reduced, the heavy oil drains into the lower producer wellbore, from which the oil is extracted. Preferably, the two wellbores are drilled at a distance of only a few meters from one other. The placement of the injector wellbore needs to be achieved with a very small margin in distance.

Therefore, such downhole procedures present some challenges. If the injector wellbore is positioned too close to the producer wellbore, the producing well would be exposed to very high pressure and temperature. If the injector wellbore is positioned too far from the producer wellbore, the efficiency of the SAGD process is reduced. It is well known that traditional magnetic and gravity-based surveying techniques suffer from a widening cone of uncertainty as the wells become longer, making it more difficult to achieve the precision in placement that is required in certain ranging applications, such as SAGD applications.

Convention magnetic ranging methods with surface excitation assumes only a two-dimensional ("2D") magnetic field in the plane perpendicular to the tool axis. Such methods assume the target well and drilling well are parallel to each other. However, this assumption is not valid when there are pitch and yaw angles between two wells, especially during build section drilling. As a result, some distance and direction error will result due to this erroneous 2D magnetic field assumption.

Another issue facing conventional magnetic ranging with surface excitation methods is the interference from nearby wells. Here, as the drilling well is being drilled, the current generated by the surface excitation flows along the target well casing and leaks out to nearby wells. This leakage current on the nearby wells will in turn generate magnetic fields which interfere (i.e., interference) with magnetic fields generated by the target well casing. As a result, the interference causes errors in the magnetic fields and gradient fields received by the sensing system, and hence result in errors in the calculated ranging direction and distance.

DESCRIPTION OF ILLUSTRATIVE EMBODIMENTS

Figure 1A:
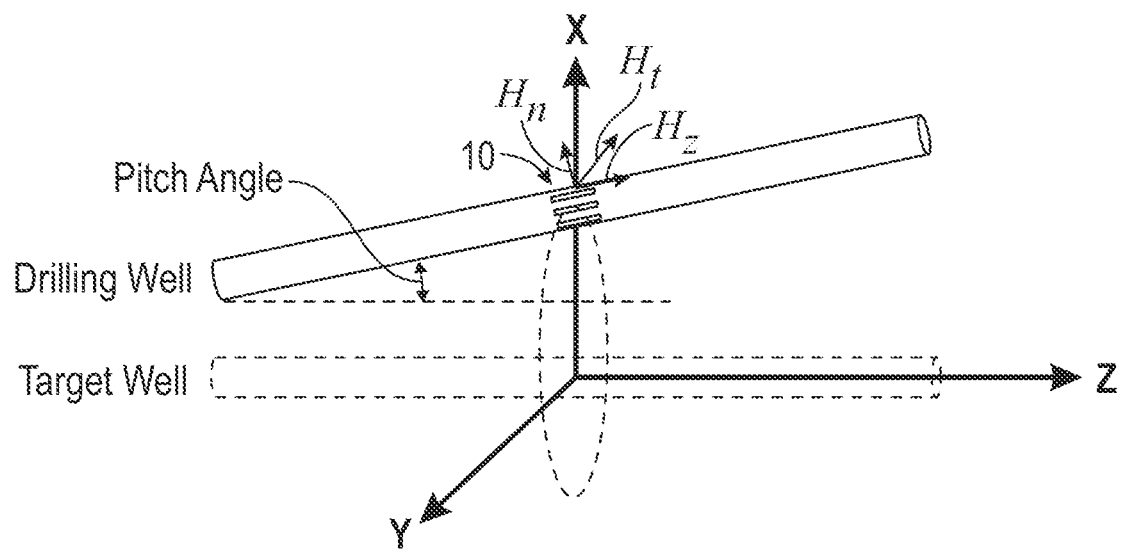
FIG. 1A is a side view of a drilling well and target well, which is provided to explain the pitch angle effect when two wells are not parallel.

Illustrative embodiments and related methods of the present disclosure are described below as they might be employed in a magnetic ranging method utilizing 3D magnetic field measurements and 3D gradient field measurements to correct range calculations. In the interest of clarity, not all features of an actual implementation or methodology are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure. Further aspects and advantages of the various embodiments and related methods of the disclosure will become apparent from consideration of the following description and drawings.

As described herein, illustrative embodiments and methods of the present disclosure describe magnetic ranging systems that use 3D magnetic field measurements and 3D gradient field measurements to correct range calculation errors due to pitch and yaw angle effects. Illustrative embodiments include tool configurations to generate 3D magnetic fields and methods to correct for the non-parallel effect (pitch and yaw angle effect) in ranging distance and direction calculations (e.g., in the build section of well) using the 3D magnetic field measurements. In addition, illustrative embodiments include methods to decouple interference in ranging application using 3D gradients field measurements during certain applications (e.g., re-drill applications). The 3D gradient field allows more magnetic field components to be obtained, including those that are both sensitive and insensitive to nearby wells. The interference from nearby wells may then be decoupled using the sensitive and insensitive components.

In a generalized method of the present disclosure, one or more magnetic receivers are deployed in a second wellbore positioned adjacent a first wellbore, the magnetic receivers being located on a tool body. Magnetic fields emitted from the first wellbore are measured by the magnetic receivers and used to calculate a range between the first and second wellbores. The calculated range includes at least one of a distance between the first and second wellbores or a direction of the first wellbore in relation to the second wellbore. While the magnetic receivers are positioned at a first axial position along the second wellbore, a first magnetic field emitted from the first wellbore is measured. While the magnetic receivers are positioned at a second axial position (axially offset from the first axial position), a second magnetic field emitted from the first wellbore is measured. Processing circuitry communicably coupled to the receivers then combine the first and second magnetic field data to form a 3D magnetic field measurement. The 3D magnetic field measurement is then used to correct the range calculation between the first and second wellbore.

In an alternative generalized method of the present disclosure, a method for downhole magnetic ranging between a first and second wellbore includes deploying one or more magnetic receivers in a second wellbore positioned adjacent a first wellbore and an interfering source of magnetic fields (e.g., ghost well). The receivers measure magnetic fields being emitted from the first wellbore at different axial positions along the second wellbore to form a 3D magnetic field. The system then calculates a 3D gradient field across receivers positioned at different tool face angles. Components of the 3D gradient field which are sensitive and insensitive to the interfering source are then identified and selected. A modeling response library is then searched to select a ranging match of the insensitive and sensitive components, which are then used to decouple the interfering source from the ranging calculation. The decoupled ranging solution is then used to perform ranging.

Figure 1B:
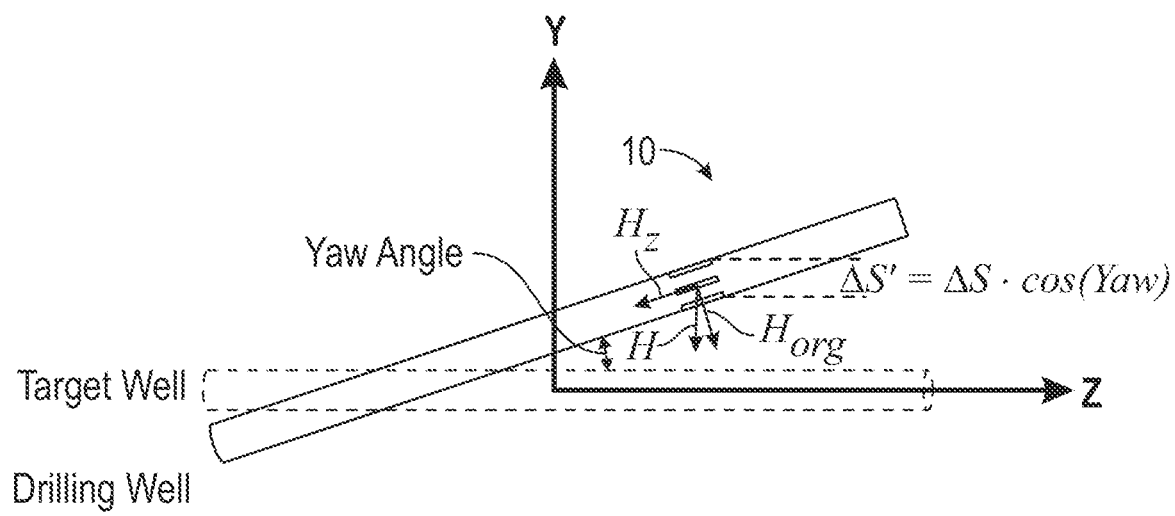
FIG. 1B is a top-side view of a drilling well and target well, which is provided to explain the yaw angle effect when two wells are not parallel.

FIG. 1A is a side view of a drilling well and target well, which is provided to explain the pitch angle effect when two wells are not parallel. Z is the drilling direction. X and Y are the high side and right side direction of the target well, respectively. In this case, a new well is being drilled above the target well with an upward pitch angle. The pitch angle can be seen as the rotation angle with respect to Y-axis. FIG. 1B is a top-side view of a drilling well and target well, which is provided to explain the yaw angle effect when two wells are not parallel. Here, the drilling well is above the target well but with some azimuthal offset, which is referred to as yaw angle. $\Delta S$ refers to the physical separation between two magnetometers, while $\Delta S'$ is the separation projection along the ranging direction.

Pitch angle and yaw angle can be present at the same time during drilling. In surface excitation ranging theory and calibration methods, two parallel pipes are assumed. Therefore, pitch and yaw angles result in errors in the distance and direction calculations generated using the ranging formula and calibration matrix. To explain this more fully, as shown in FIG. 1A, each magnetic sensor of receiver pack 10 will receive three field components:

$H_n$: Normal component along tool radial direction
$H_t$: Tangential component along tool tangential direction
$H_z$: Z-component along tool axis Since all sensors are in the same plane perpendicular to the tool axis, $H_z$ is zero. If a yaw angle presents as shown in FIG. 1B, a non-zero $H_z$ will result. Hence, yaw angle can be obtained from the formula below:

$$yaw = a\tan d\left(\frac{H_z}{H_{org}}\right), \quad \text{Eq. 1}$$

where:

$$H_{org} = \sqrt{H_t^2 + H_n^2}, \quad \text{Eq. 2}$$

and atan d is arctangent, $H_z$ is the magnetic field component along tool axis, Ht is the Tangential magnetic field component along tool tangential direction, Hn is the Normal magnetic field component along tool radial direction, and Horg is the Orthogonal magnetic field component. However, using only the method above, the pitch angle cannot be obtained because the H-field direction will not be changed by pitch angle. As shown in FIG. 1A, field direction is always perpendicular to the tool axis with a different pitch angle. Therefore, the pitch angle effect cannot be decoupled from the received field.

Figure 2A:
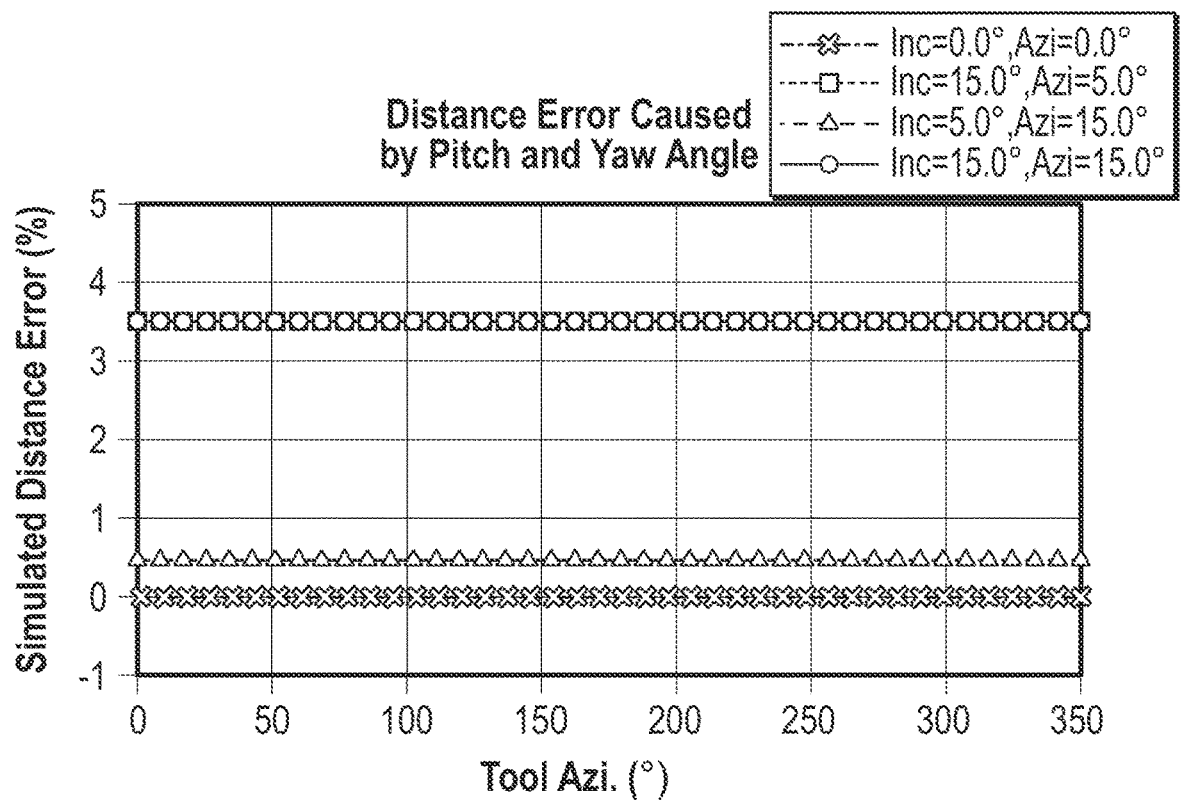
FIG. 2A is a plot showing the error in a distance calculation due to the pitch and yaw angle effect.
Figure 2B:
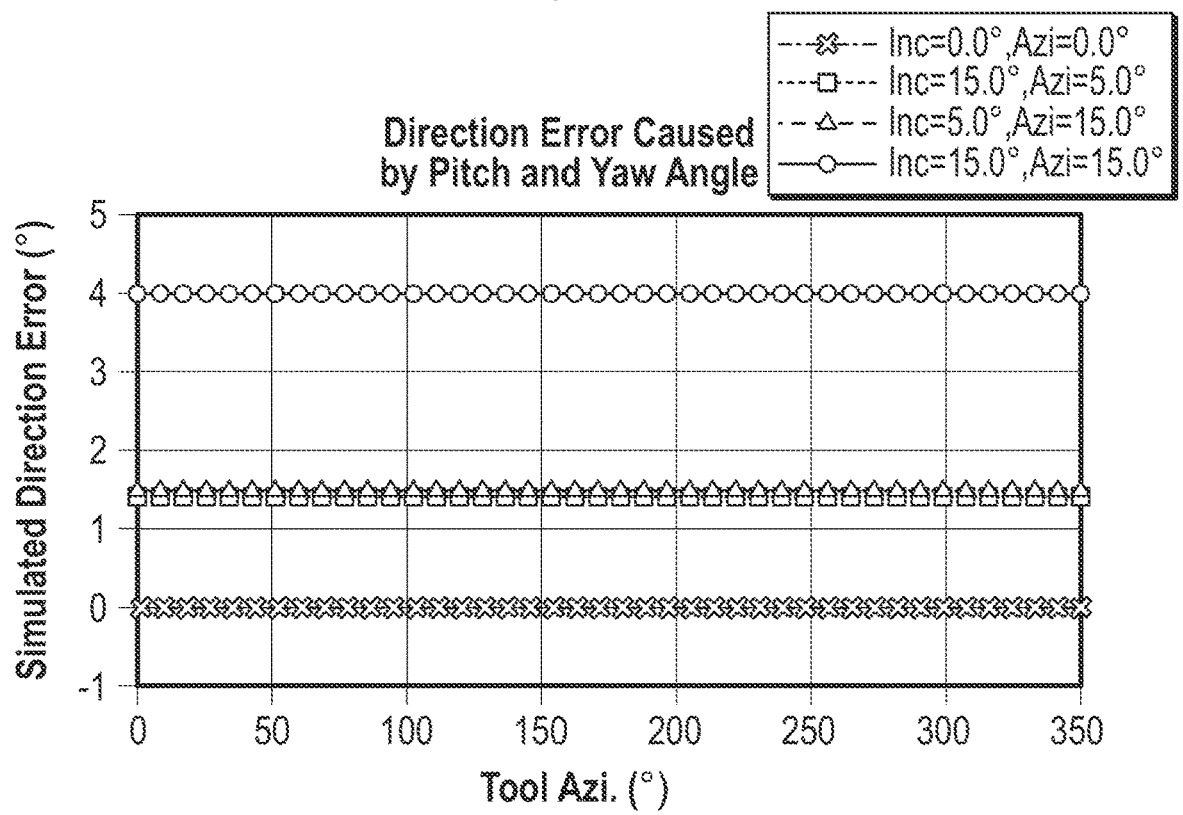
FIG. 2B is a plot showing the error in a direction calculation showing due to the pitch and yaw angle effect.

FIG. 2A is a plot showing the error in a distance calculation due to the pitch and yaw angle effect. Each line plotted in the graph represents a simulated distance calculation with different amounts of pitch (Inc) angle and yaw (Azi) angle in degrees. FIG. 2B is a plot showing the error in a direction calculation showing due to the same pitch and yaw angle effect as in FIG. 2A. To generate the plots, assume the correct distance and direction from well A to well B is Dis0 and Dir0 if there is no pitch angle and yaw angle. Then the pitch angle Inc and yaw angle Azi are added to well A. Modeling is conducted for well A and well B to calculate the signal received at well A with excitation at well B. Dis1 and Dir1 are then calculated from the received signal. Dis1 and Dir1 are compared with Dis0 and dir0 to obtain the distance error and direction error. The errors are calculated for different tool azimuth angles (well A rotation angles) and plotted in the FIGS. 2A and 2B. As can be seen, with Inc and Azi=0 degrees, the simulated distance and direction error is 0%; with Inc=15 degrees and Azi=5 degrees, the simulated distance error is 3.5% and the simulated direction error is 1.5%; and so on.

Therefore, as explained above, the pitch angle cannot be obtained using conventional methods alone and, therefore, the pitch angle effect cannot be decoupled from the received field.

Figure 3A:
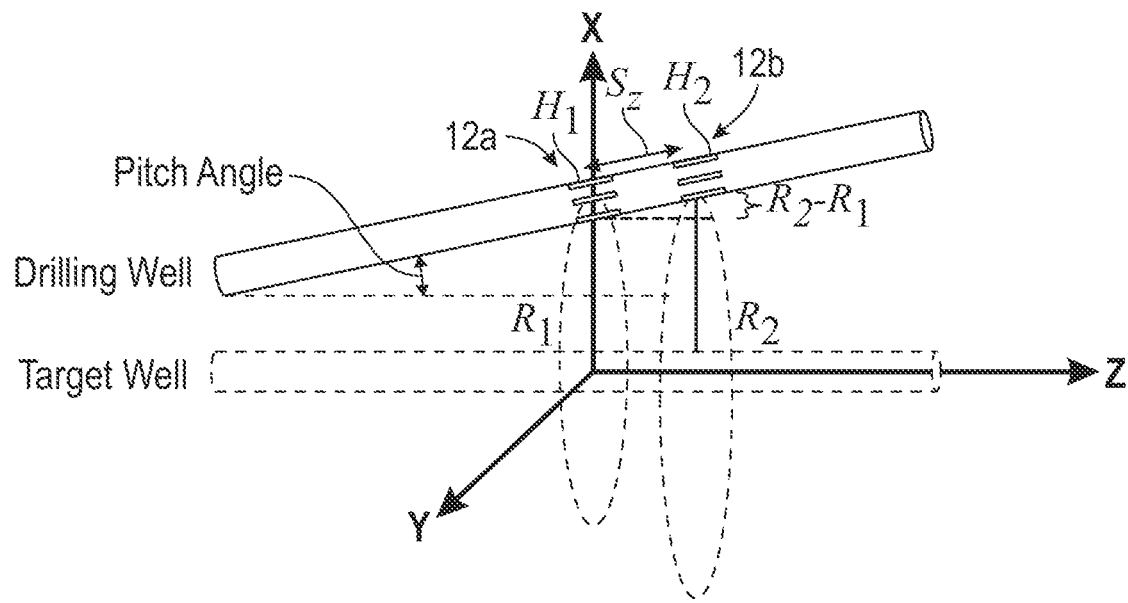
FIG. 3A is a side view of a drilling and target well, along with two sets of magnetic sensor packs used to generate 3D fields to thereby perform 3D field ranging, according to certain illustrative embodiments of the present disclosure.

To obtain the pitch angle, illustrative methods of the present disclosure measure 3D magnetic fields by deploying two set of magnetic receiver packs with some Z-direction axial offset ($S_z$) along the drilling tool axis, as shown in FIG. 3A. It is this Z-direction offset that enables generation of the 3D fields. FIG. 3A is a side view of a drilling and target well, along with two sets of magnetic sensor packs 12a and 12b axially separated along the tool, used to generate 3D fields to thereby perform 3D field ranging, according to certain illustrative embodiments of the present disclosure. For each set of ranging sensors 12a and 12b, the system calculates a distance $R_1$ and $R_2$ to the target well from the H-field received at that sensor of a given sensor pack 12a and 12b. In certain illustrative methods, distances $R_1$ and $R_2$ are first corrected by the yaw angle obtained from Equation 1 above, using the following:

$$R'_1 = R_1 \cdot \cos(yaw) \quad \text{Eq. 3, and}$$

$$R'_2 = R_2 \cdot \cos(yaw) \quad \text{Eq. 4.}$$

The pitch angle can be obtained from the difference between two distances obtained from two sensor sets as below:

$$\text{pitch} = \arcsin\left(\frac{R'_2 - R'_1}{S_z}\right), \quad \text{Eq. 5}$$

where ($S_z$) is the Z-direction offset.

Once the yaw and pitch angles have been calculated, modeling is performed to predict the distance and direction errors (errDis,errDir) as illustrated in FIGS. 2A and 2B, also referred to as predicted ranging errors. Illustrative modeling methods include analytical biot savart methods or numerical integral methods. Thereafter, the system applies the predicted distance and direction errors to correct the ranging solutions/calculations through use of the following:

$$Dis = (R'_2 + R'_1)/2/(1 + errDis), \text{ and} \quad \text{Eq. 6}$$

$$Dir = \frac{Ang_1 + Ang_2}{2} - errDir, \quad \text{Eq. 7}$$

Where $Ang_1$ is the calculated ranging direction at receiver pack 1 and $Ang_2$ is the calculated ranging direction at receiver pack 2.

Figure 3B:
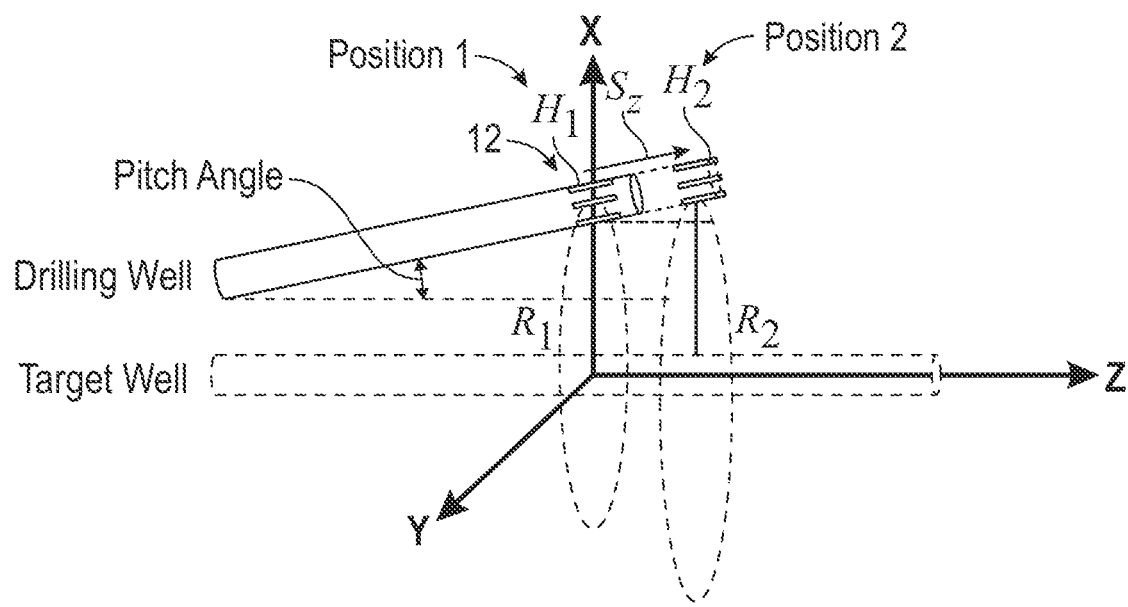
FIG. 3B illustrates an alternative method for generating 3D fields, according to certain illustrative methods of the present disclosure.

FIG. 3B illustrates an alternative method for generating 3D fields, according to certain illustrative methods of the present disclosure. The system of FIG. 3B enables 3D field without the use of two sets of sensors. Rather, only a single sensor pack is used to generate a "pseudo" gradient field along the wellbore direction using multiple points at different measured depth position to obtain a 3D gradient field. For example, the first measurement can be taken at position 1 with sensor pack 12. Thereafter, the drilling tool is moved axially a distance Sr along the drilling direction and to obtain the second measurement at position 2 with the same sensor pack 12. Accordingly, the 3D field and 3D gradient field can be obtained from these two sets of measurement.

Figure 4:
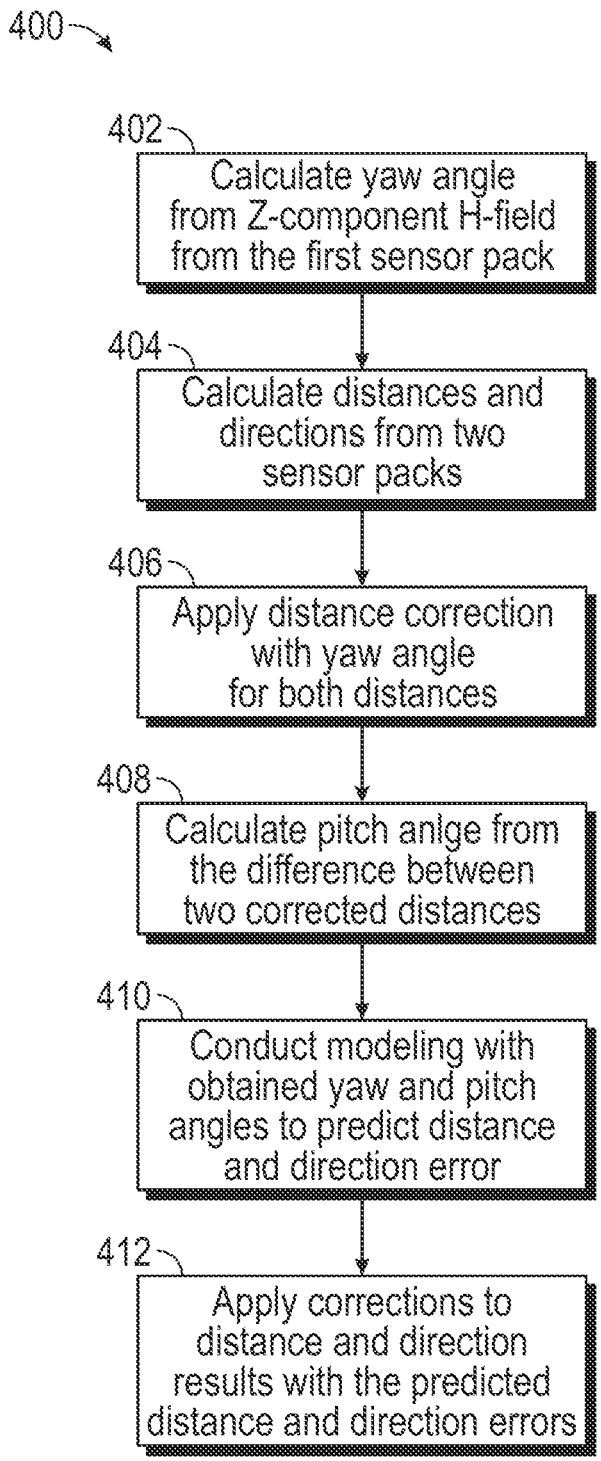
FIG. 4 is a flow chart of a method to correct for pitch and yaw effects in ranging calculations, according to certain illustrative methods of the present disclosure.

Using the equations above, FIG. 4 is a flow chart of a method to correct for pitch and yaw effects in ranging calculations, according to certain illustrative methods of the present disclosure. With reference to FIGS. 3 and 4, at block 402 of method 400, the system calculates the yaw angle from the Z-component H-field from first sensor pack 12a. At block 404, the system calculates the distances and directions between the drilling and target wells using first and second sensor packs 12a and 12b. At block 406, the system determines the distance correction and applies it to the distance calculations for both sensor packs 12a and 12b in order to correct the calculated range. At block 408, the system calculates the pitch angle from the difference between the corrected range (the two corrected distance calculations). At block 410, the system performs modeling using the yaw and pitch angles to predict the distance and direction errors. At block 412, the system applies the corrections (calculated using Eqs. 6 and 7) to the distance and direction results using the predicted distance and direction errors.

Figure 5:
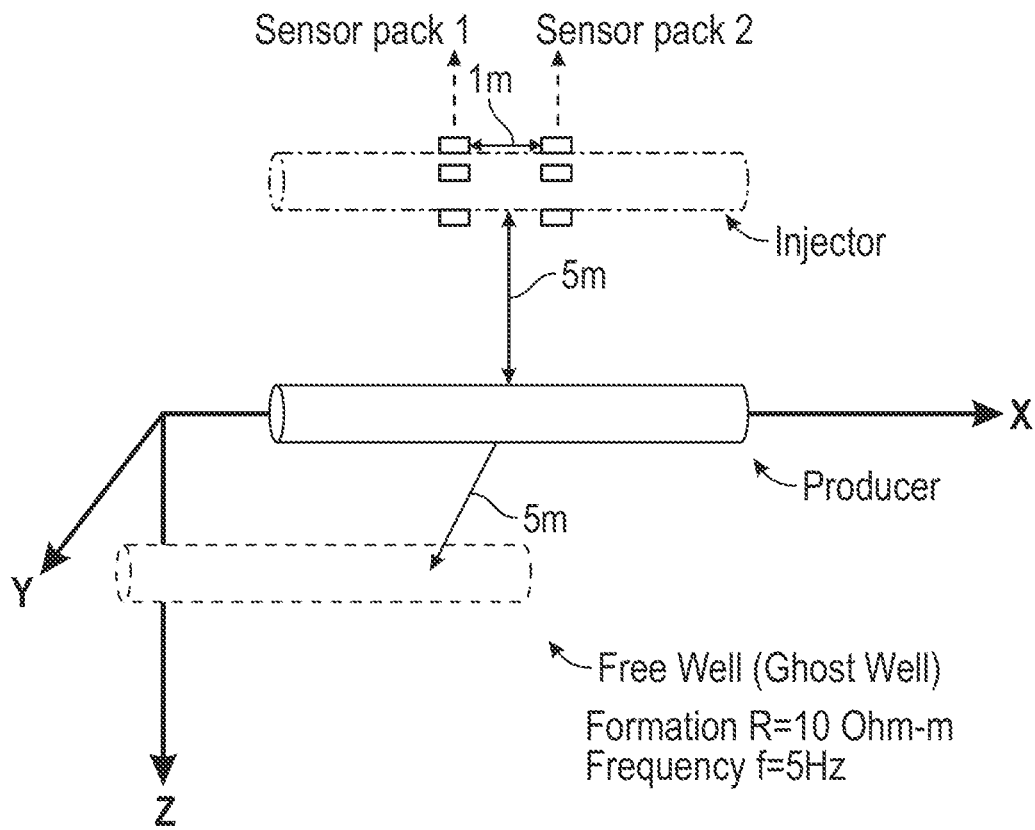
FIG. 5 is an illustration of two sensor packs used to calculate a 3D gradient field, according to certain illustrative methods of the present disclosure.

In yet other illustrative methods of the present disclosure, the 3D field measurements may also be used to decouple the interference from nearby wells. To decouple the interference from nearby wells in ranging application, magnetic field components that are sensitive and insensitive to ghost well interference are necessary. In order to obtained these field components, the present disclosure employs use of a 3D gradient. FIG. 5 is an illustration of two ranging sensor packs used to calculate a 3D gradient field, according to certain illustrative methods of the present disclosure.

As shown in FIG. 5, a three well model may be employed and thinwire code used for modeling the 3D gradient field. However, other suitable modeling codes may also be employed. Two sets of ranging sensors (sensor pack 1 and sensor pack 2) with eight magnetometers in each set are employed. Normal and tangential components of the magnetic field at each magnetometer are calculated with and without the ghost well (or some other interfering source of magnetic fields). The gradient fields within each set and gradient fields across two sets of magnetometers are analyzed. In this example, it is found that all components within each ranging sensor set are sensitive to the ghost well. However, one of the cross magnetometer gradient field components has minimum magnitude and phase change when the ghost well presents itself. Hence, this component may be used as the insensitive component to decouple the ghost well interference.

Figure 6:
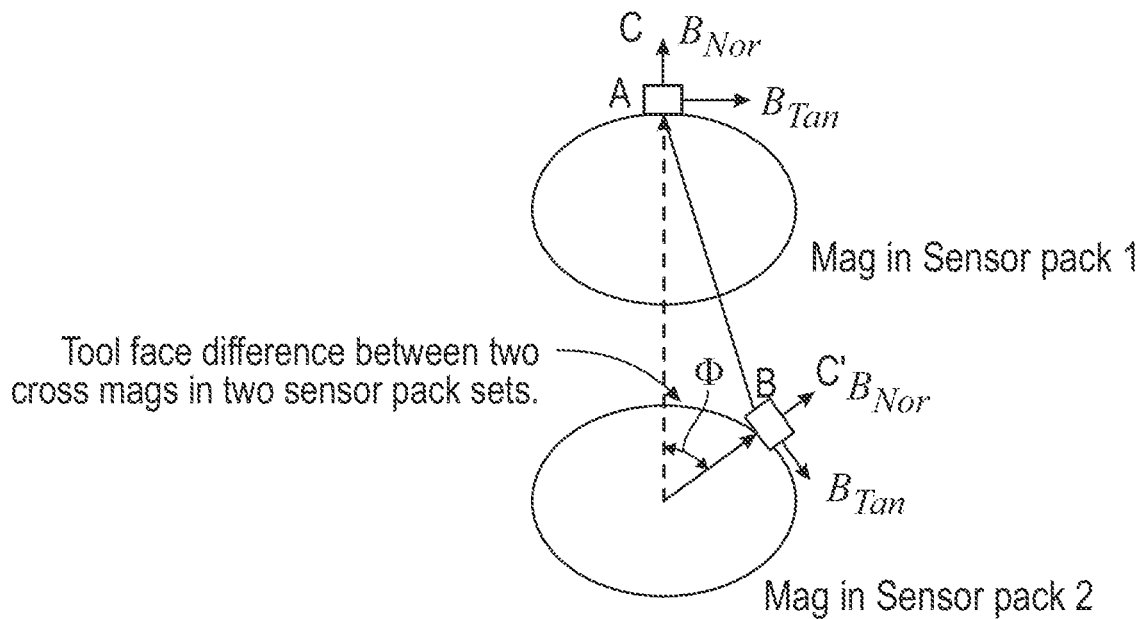
FIG. 6 illustrates a gradient field between two cross magnetometers in two different sensors packs, according to certain illustrative embodiments of the present disclosure.

FIG. 6 illustrates a gradient field between two cross magnetometers in two different sensors packs, according to certain illustrative embodiments of the present disclosure. In this example, the system investigates gradient fields for different magnetometer pairs with different tool face angle separations. FIG. 6 also illustrates how illustrative systems described herein calculate gradient field components. For example, the normal-to-normal gradient field component between magnetometer A in sensor pack 1 and magnetometer B in sensor pack 2 are desired. In certain methods, a plane with AB inside is selected. The plane may be plane CAB aligned to magnetometer A normal, or C'BA aligned to mag B normal, or another plane between these two planes. After that, $B_{Nor}$ for magnetometer A and magnetometer B are projected to the chosen plane. The difference between the two projections is then divided by the distance between AB to get the gradient field component $GB_{AB_{N-N}}$. Other gradient field components can be calculated in the same way using the following:

$$GB_{AB_{i-j}} = \frac{\left|B_{i_A}(\text{measured})\right| - \left|\overrightarrow{B_{j_B}}(\text{measured}) \cdot \left[1 - (\widehat{\overrightarrow{AB}} \times \widehat{\overrightarrow{BC}})\right]\right|}{|\overrightarrow{AB}|},$$

Eq. 8 where i, j=Nor, Tan, or Z planes (Nor is radial direction in tool cross section plane, Tan is tangential direction in tool cross section plane, Z is along tool axis), $\widehat{\overrightarrow{AB}}$ is the unit vector from point A to point B, $\widehat{\overrightarrow{BC}}$ is the unit vector from point B to point C, and → represents vector (but not unit vector).

The measured 3D gradient field components calculated using Eq. 8 may then be equated with the 3D gradient field calculated from the distance and direction using the following:

$$GB_{AB}(\text{measured}) = \begin{bmatrix} GB_{AB_{T-T}} \\ GB_{AB_{T-N}} \\ GB_{AB_{T-Z}} \\ GB_{AB_{N-T}} \\ GB_{AB_{N-N}} \\ GB_{AB_{N-Z}} \\ GB_{AB_{Z-T}} \\ GB_{AB_{Z-N}} \\ GB_{AB_{Z-Z}} \end{bmatrix} =$$

Eq. 9

$$GB_{AB}(Dis, Dir, \beta_A, \beta_B) = \begin{bmatrix} GB_{AB_{T-T}}(Dis, Dir, \beta_A, \beta_B) \\ GB_{AB_{T-N}}(Dis, Dir, \beta_A, \beta_B) \\ GB_{AB_{T-Z}}(Dis, Dir, \beta_A, \beta_B) \\ GB_{AB_{N-T}}(Dis, Dir, \beta_A, \beta_B) \\ GB_{AB_{N-N}}(Dis, Dir, \beta_A, \beta_B) \\ GB_{AB_{N-Z}}(Dis, Dir, \beta_A, \beta_B) \\ GB_{AB_{Z-T}}(Dis, Dir, \beta_A, \beta_B) \\ GB_{AB_{Z-N}}(Dis, Dir, \beta_A, \beta_B) \\ GB_{AB_{Z-Z}}(Dis, Dir, \beta_A, \beta_B) \end{bmatrix}.$$

Equation 9 provides the equation system.

The following equations are expansions of equation 9 and illustrates how the equation system for calculating distance and direction are built:

$$\frac{\left|B_{Tan_A}(\text{measured})\right| - \left|\overrightarrow{B_{Tan_B}}(\text{measured}) \cdot \left[1 - (\widehat{\overrightarrow{AB}} \times \widehat{\overrightarrow{BC}})\right]\right|}{|\overrightarrow{AB}|} =$$

Eq. 10a $$\frac{\left|B_{Tan_A}\right|(Dis, Dir, \beta_A) - \left|\overrightarrow{B_{Tan_B}}(Dis, Dir, \beta_B) \cdot \left[1 - \widehat{n_{ABC}}(S, r, \Delta\beta)\right]\right|}{|\overrightarrow{AB}|(S, r, \Delta\beta)},$$

Eq. 10b $$\frac{\left|B_{Tan_A}(\text{measured})\right| - \left|\overrightarrow{B_{Nor_B}}(\text{measured}) \cdot \left[1 - (\widehat{\overrightarrow{AB}} \times \widehat{\overrightarrow{BC}})\right]\right|}{|\overrightarrow{AB}|} =$$

$$\frac{\left|B_{Tan_A}\right|(Dis, Dir, \beta_A) - \left|\overrightarrow{B_{Nor_B}}(Dis, Dir, \beta_B) \cdot \left[1 - \widehat{n_{ABC}}(S, r, \Delta\beta)\right]\right|}{|\overrightarrow{AB}|(S, r, \Delta\beta)},$$

Eq. 10c $$\frac{\left|B_{Tan_A}(\text{measured})\right| - \left|\overrightarrow{B_{Z_B}}(\text{measured}) \cdot \left[1 - (\widehat{\overrightarrow{AB}} \times \widehat{\overrightarrow{BC}})\right]\right|}{|\overrightarrow{AB}|} =$$

$$\frac{\left|B_{Tan_A}\right|(Dis, Dir, \beta_A) - \left|\overrightarrow{B_{Z_B}}(Dis, Dir, \beta_B) \cdot \left[1 - \widehat{n_{ABC}}(S, r, \Delta\beta)\right]\right|}{|\overrightarrow{AB}|(S, r, \Delta\beta)}.$$

Eq. 10d $$\frac{\left|B_{Nor_A}(\text{measured})\right| - \left|\overrightarrow{B_{Tan_B}}(\text{measured}) \cdot \left[1 - (\widehat{\overrightarrow{AB}} \times \widehat{\overrightarrow{BC}})\right]\right|}{|\overrightarrow{AB}|} =$$

$$\frac{\left|B_{Nor_A}\right|(Dis, Dir, \beta_A) - \left|\overrightarrow{B_{Tan_B}}(Dis, Dir, \beta_B) \cdot \left[1 - \widehat{n_{ABC}}(S, r, \Delta\beta)\right]\right|}{|\overrightarrow{AB}|(S, r, \Delta\beta)},$$

Eq. 10e $$\frac{\left|B_{Nor_A}(\text{measured})\right| - \left|\overrightarrow{B_{Nor_B}}(\text{measured}) \cdot \left[1 - (\widehat{\overrightarrow{AB}} \times \widehat{\overrightarrow{BC}})\right]\right|}{|\overrightarrow{AB}|} =$$

$$\frac{\left|B_{Nor_A}\right|(Dis, Dir, \beta_A) - \left|\overrightarrow{B_{Nor_B}}(Dis, Dir, \beta_B) \cdot \left[1 - \widehat{n_{ABC}}(S, r, \Delta\beta)\right]\right|}{|\overrightarrow{AB}|(S, r, \Delta\beta)},$$

Eq. 10f $$\frac{\left|B_{Nor_A}(\text{measured})\right| - \left|\overrightarrow{B_{Z_B}}(\text{measured}) \cdot \left[1 - (\widehat{\overrightarrow{AB}} \times \widehat{\overrightarrow{BC}})\right]\right|}{|\overrightarrow{AB}|} =$$

$$\frac{\left|B_{Nor_A}\right|(Dis, Dir, \beta_A) - \left|\overrightarrow{B_{Z_B}}(Dis, Dir, \beta_B) \cdot \left[1 - \widehat{n_{ABC}}(S, r, \Delta\beta)\right]\right|}{|\overrightarrow{AB}|(S, r, \Delta\beta)},$$

Eq. 10g $$\frac{\left|B_{Z_A}(\text{measured})\right| - \left|\overrightarrow{B_{Tan_B}}(\text{measured}) \cdot \left[1 - (\widehat{\overrightarrow{AB}} \times \widehat{\overrightarrow{BC}})\right]\right|}{|\overrightarrow{AB}|} =$$

$$\frac{\left|B_{Z_A}\right|(Dis, Dir, \beta_A) - \left|\overrightarrow{B_{Tan_B}}(Dis, Dir, \beta_B) \cdot \left[1 - \widehat{n_{ABC}}(S, r, \Delta\beta)\right]\right|}{|\overrightarrow{AB}|(S, r, \Delta\beta)},$$

10h $$\frac{\left|B_{Z_A}(\text{measured})\right| - \left|\overrightarrow{B_{Nor_B}}(\text{measured}) \cdot \left[1 - (\widehat{\overrightarrow{AB}} \times \widehat{\overrightarrow{BC}})\right]\right|}{|\overrightarrow{AB}|} =$$

-continued $$|B_{Z_A}|(Dis, Dir, \beta_A) - \frac{|\overrightarrow{B_{Nor_B}}(Dis, Dir, \beta_B) \cdot [1 - \overrightarrow{\hat{n}_{ABC}}(S, r, \Delta\beta)]|}{|\overrightarrow{AB}|(S, r, \Delta\beta)}, \text{ and}$$

$$\frac{|B_{Z_A}(\text{measured})| - |\overrightarrow{B_{Z_B}}(\text{measured}) \cdot [1 - (\overrightarrow{\hat{AB}} \times \overrightarrow{\hat{BC}})]|}{|\overrightarrow{AB}|} = \quad \text{Eq. 10i}$$

$$\frac{|B_{Z_A}|(Dis, Dir, \beta_A) - |\overrightarrow{B_{Z_B}}(Dis, Dir, \beta_B) \cdot [1 - \overrightarrow{\hat{n}_{ABC}}(S, r, \Delta\beta)]|}{|\overrightarrow{AB}|(S, r, \Delta\beta)},$$

where S is the separation between two sensor packs, r is the distance of the magnetometer to the tool center, $\Delta\beta = \beta_A - \beta_B$ ($\beta$ is the tool face angles for magA and magB; magA and magB are magnetometers in two different receiver packs. Hence in the equation system 10a-i above, there are nine equations and four unknowns (Dis, Dir, PA-PB). Thus, it is an overdetermined system in which distance and direction can be obtained. Other magnetometer pairs may be used to obtain more equations.

To incorporate the non-parallel effect and interference from nearby wells, the system adds more parameters to calculate the 3D gradient field (pitch angle, yaw angle, nearby wells with $Dis_1$, $Dir_1$, $Dis_2$, $Dir_2$) to generate the following equation system with more unknowns:

$$\frac{|B_{i_{mag1}}(\text{measured})| - |\overrightarrow{B_{j_{mag2}}}(\text{measured}) \cdot [1 - [1 - \hat{n}(S, r, \Delta\beta)]]|}{|\overrightarrow{mag1 - mag2}|} = \quad \text{Eq. 11}$$

$$\frac{\left|B_{i_{mag1}}\right|\binom{Dis, Dir, Dis_1, Dir_1, Dis_2, Dir_2, \ldots}{\text{pitch}, yaw, \beta_{mag1}} - \left|\overrightarrow{B_{j_{mag2}}}\binom{Dis, Dir, Dis_1, Dir_1, Dis_2, Dir_2, \ldots}{\text{pitch}, yaw, \beta_{mag1}} \cdot [1 - \hat{n}(S, r, \Delta\beta)]\right|}{|\overrightarrow{mag1 - mag2}|(S, r, \Delta\beta)},$$

where i,j=Nor, Tan, and Z planes, mag1 is one of the magnetometers in NGR1, mag2 is one of the magnetometers in NGR2, Dis and Dir are distance and direction from drilling well to target well, and $Dis_{1,2}, \ldots$ and $Dir_{1,2}, \ldots$ are distance and direction from drilling well to the interference wells nearby.

Accordingly, for two 8-magnetometer sensor packs, the system calculates a total of $C_2^8 \times 9 = 252$ equations, some of which may have dependence to each other but, can be solved for ranging systems with 2-3 interference wells.

Figure 7A:
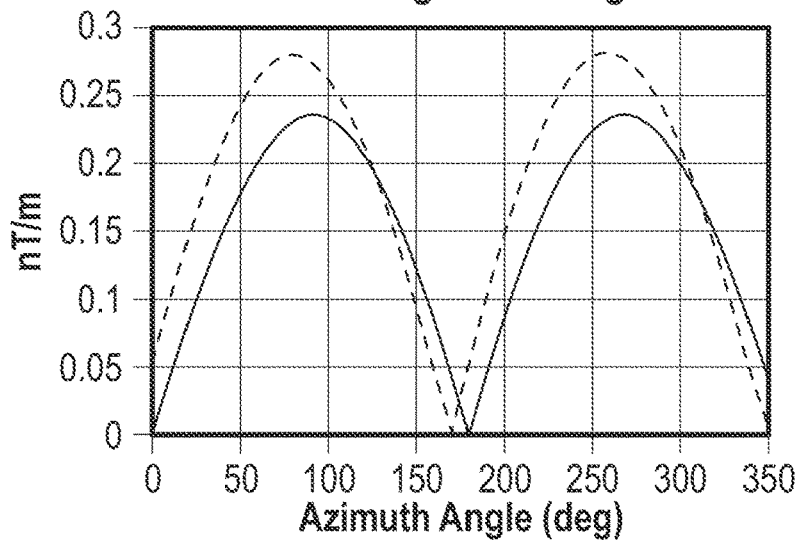
FIG. 7A plots the gradient field between two sensors with a 0 degree tool face difference.
Figure 7B:
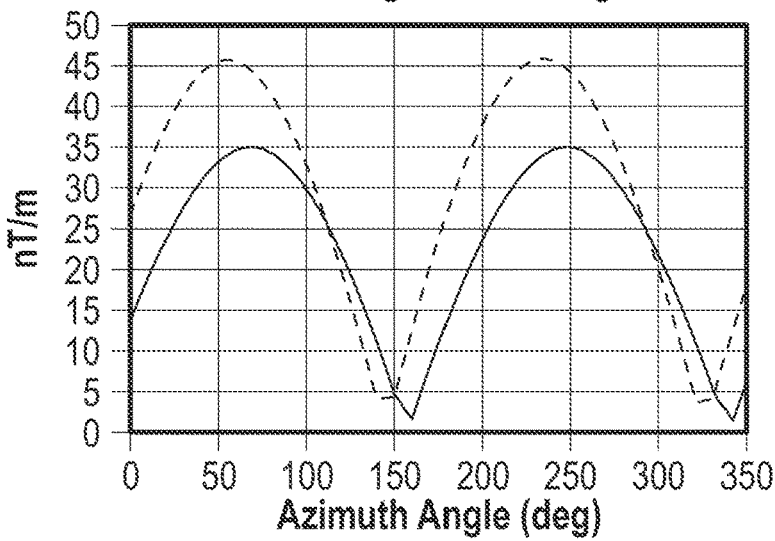
FIG. 7B plots the gradient field between two sensors with a 45 degree tool face difference.
Figure 7C:
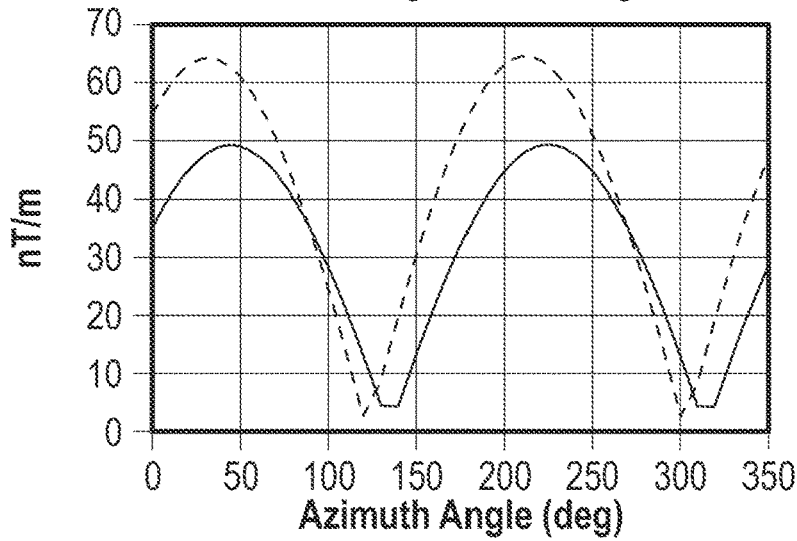
FIG. 7C plots the gradient field between two sensors with a 90 degree tool face difference.
Figure 7D:
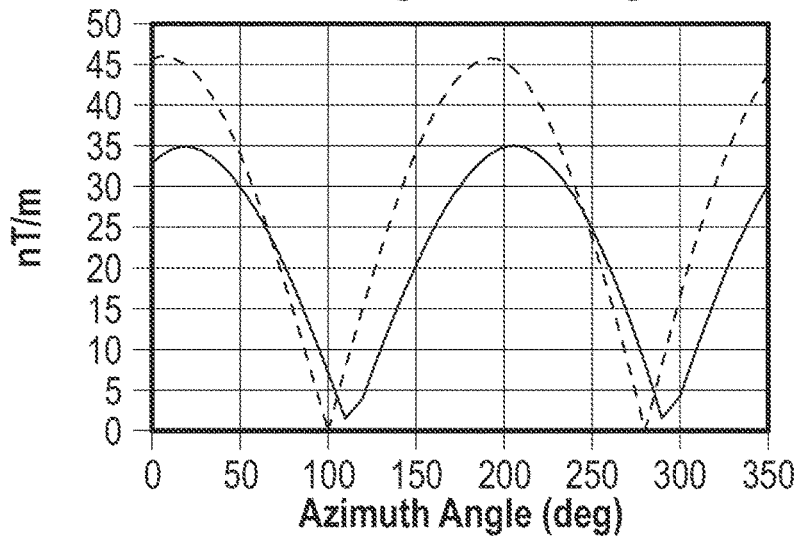
FIG. 7D plots the gradient field between two sensors with a 135 degree tool face difference.
Figure 7E:
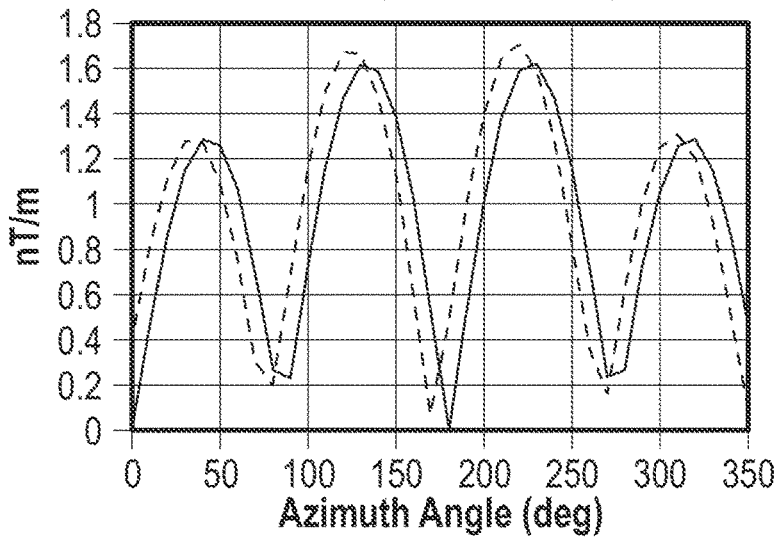
FIG. 7E plots the gradient field between two sensors with a 180 degree tool face difference.
Figure 7F:
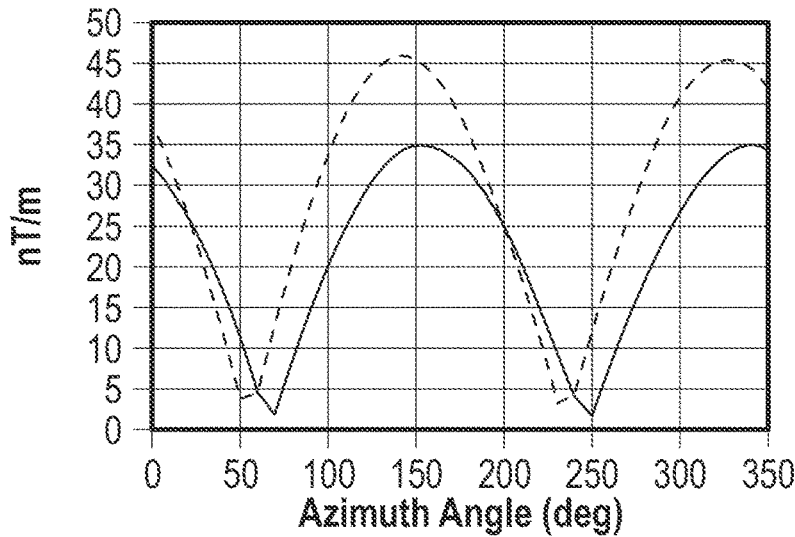
FIG. 7F plots the gradient field between two sensors with a 225 degree tool face difference.
Figure 7G:
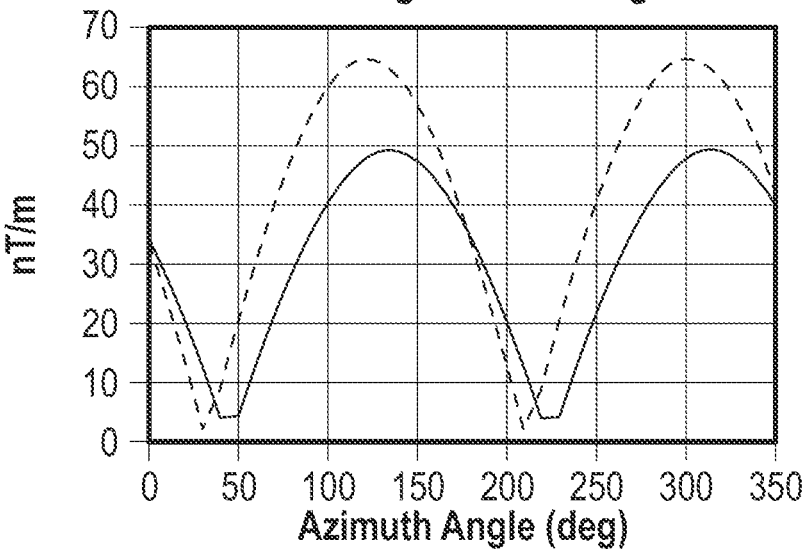
FIG. 7G plots the gradient field between two sensors with a 270 degree tool face difference.
Figure 7H:
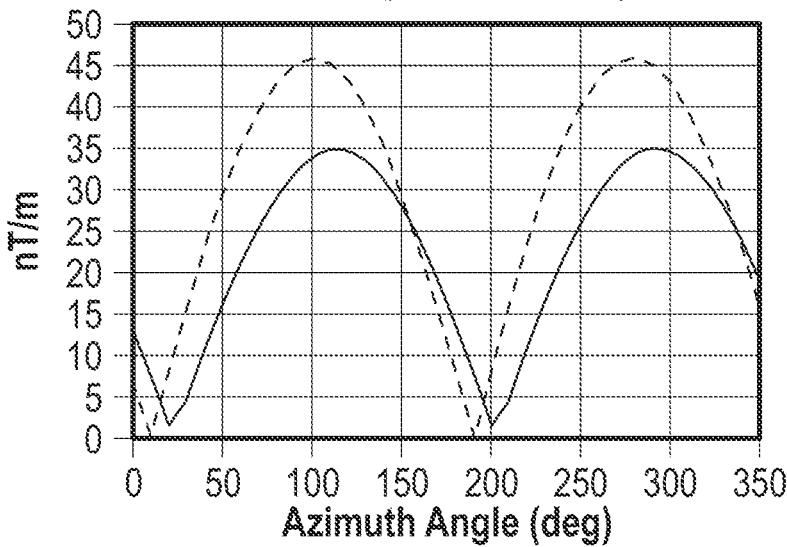
FIG. 7H plots the gradient field between two sensors with a 315 degree tool face difference.

An alternative to the equation system 11 above uses pre-built 3D gradient field libraries for determining ranging distance and direction in the presence of interference wells, according to certain illustrative embodiments of the present disclosure. FIGS. 7A-7H are plots of illustrative simulated cross magnetic gradient fields between Normal-Normal fields, Tangential-Tangential fields, and Normal-Tangential fields. FIG. 7A plots the gradient field between two sensors with a 0 degree tool face difference; FIG. 7B plots the gradient field between two sensors with a 45 degree tool face difference; FIG. 7C plots the gradient field between two sensors with a 90 degree tool face difference; FIG. 7D plots the gradient field between two sensors with a 135 degree tool face difference; FIG. 7E plots the gradient field between two sensors with a 180 degree tool face difference; FIG. 7F plots the gradient field between two sensors with a 225 degree tool face difference; FIG. 7G plots the gradient field between two sensors with a 270 degree tool face difference; and FIG. 7H plots the gradient field between two sensors with a 315 degree tool face difference. In the figures, nT/m refers to the gradient field unit, Nano Tesla per meter.

In FIGS. 7A-H, it can be seen the normal-normal cross sensor gradient field with 180 degree tool face difference has a minimum magnitude and phase change when the ghost well present. Therefore, this normal-normal component can be used as the insensitive component. Similarly, Tangential-tangential cross sensor gradient field with 180 degree tool face difference and normal-tangential cross sensor gradient field with the 90/270 degree tool face difference can also be used as insensitive components.

Figure 8:
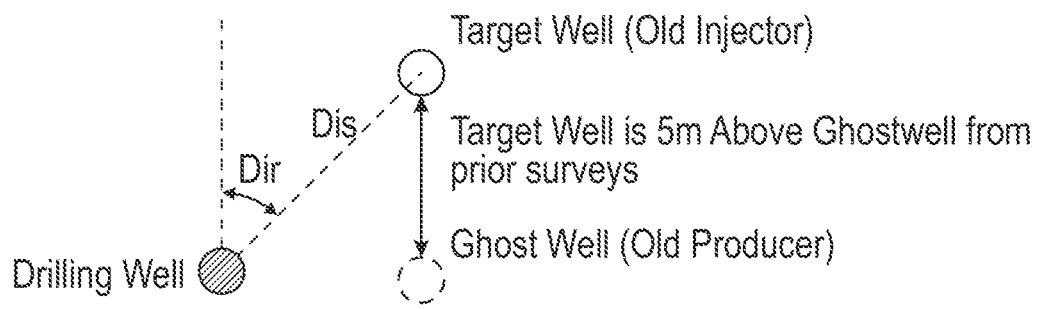
FIG. 8 illustrates a pre-well model used to build response libraries without or without a ghost well, according to certain illustrative methods of the present disclosure.

In certain embodiments, a pre-well modeling library can be built with prior known formation, pipe, and survey information. FIG. 8 illustrates a pre-well model used to build a response libraries without or without a ghost (or free) well (or some addition source), according to certain illustrative methods of the present disclosure. As shown in FIG. 8, first, a two pipe model with no ghost well is assumed. The distance and direction from the drilling well to target well are swept (i.e., simulations are conducted for an array of distance values and an array of direction values) to generate a response library for no-ghost-well case. Second, a three pipe model is assumed with a ghost well present. As shown in FIG. 8, the relative position between old injector (target well) and old producer (ghost well) pair are already known from previous survey data. Hence, without adding new variables, methods of the present disclosure generate a second response library for a ghost-well case with the same parameters being swept as for the first library.

With these two response libraries, inversion may be used to determine the distance and direction from 3D gradient field measurements. Both a sensitive and insensitive component from the gradient measurements are used to look-up/search for matches in the pre-well modeling response libraries. Here, measured responses are used to search in the response library to find the parameters (Dis, Dir). Thereafter, a set of parameters (Dis, Dir) are found to best fit both sensitive and insensitive components (i.e., the matches), which is the ranging solution that is decoupled from the ghost well interference. This illustrative method can be extended to multiple ghost wells by computing more libraries with different ghost well(s) presenting.

Figure 9:
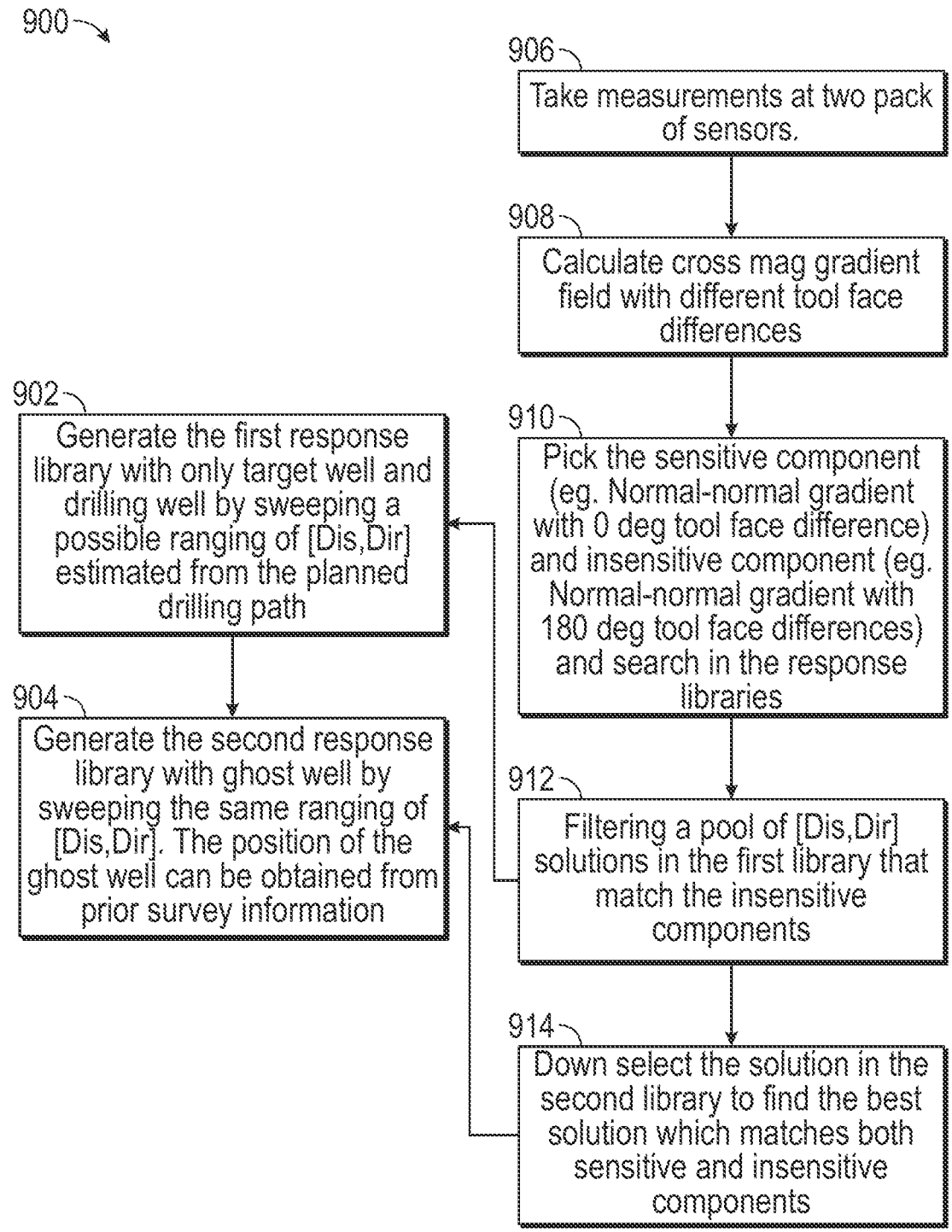
FIG. 9 is a flow chart for a re-drill application using a 3D gradient field generated by the response libraries described above, according to certain illustrative methods of the present disclosure.

FIG. 9 is a flow chart for a re-drill application using a 3D gradient field generated by the response libraries described above, according to certain illustrative methods of the present disclosure. A re-drill application is when a replacement well is drilled for an existing injector well or producer well. At block 902 of method 900, the system performs pre-well modeling by generating a first response library using only the target and drilling well. As discussed above, this first response library is generated by sweeping [Dis,Dir] estimated from the planned drill path. At block 904, a second response library is generated by including the ghost well (the ghost well is the old injector well or producer well which is in close proximity to the new drilling well) by sweeping the same [Dis,Dir] as in block 902. The position of the ghost well may be obtained from prior survey info.

At block 906, real-time drilling is occurring and magnetic field measurements are taken at two receiver packs located at different axial positions, thus forming a 3D magnetic field. At block 908, the system calculates the cross magnetometer gradient field with different tool face angles. Thereafter, the cross magnetometer 3D gradient field is compared to a modeling prediction to determine the correct range. To achieve this, at block 910, the system selects the sensitive and insensitive components and then searches the first and second response libraries. At block 910, the system filters a pool of [Dis,Dir] solutions in the first library that match the insensitive component. At block 912, the system then down-selects the solution in the second library (block 904) that best matches both sensitive and insensitive components. "Down-selecting" is the process of filtering a small number of qualitied samples from a bigger pool of samples after a qualification procedure. Once this solution is located by the system, the system applies this solution as the ranging solution decoupled from the ghost well.

Figure 10:
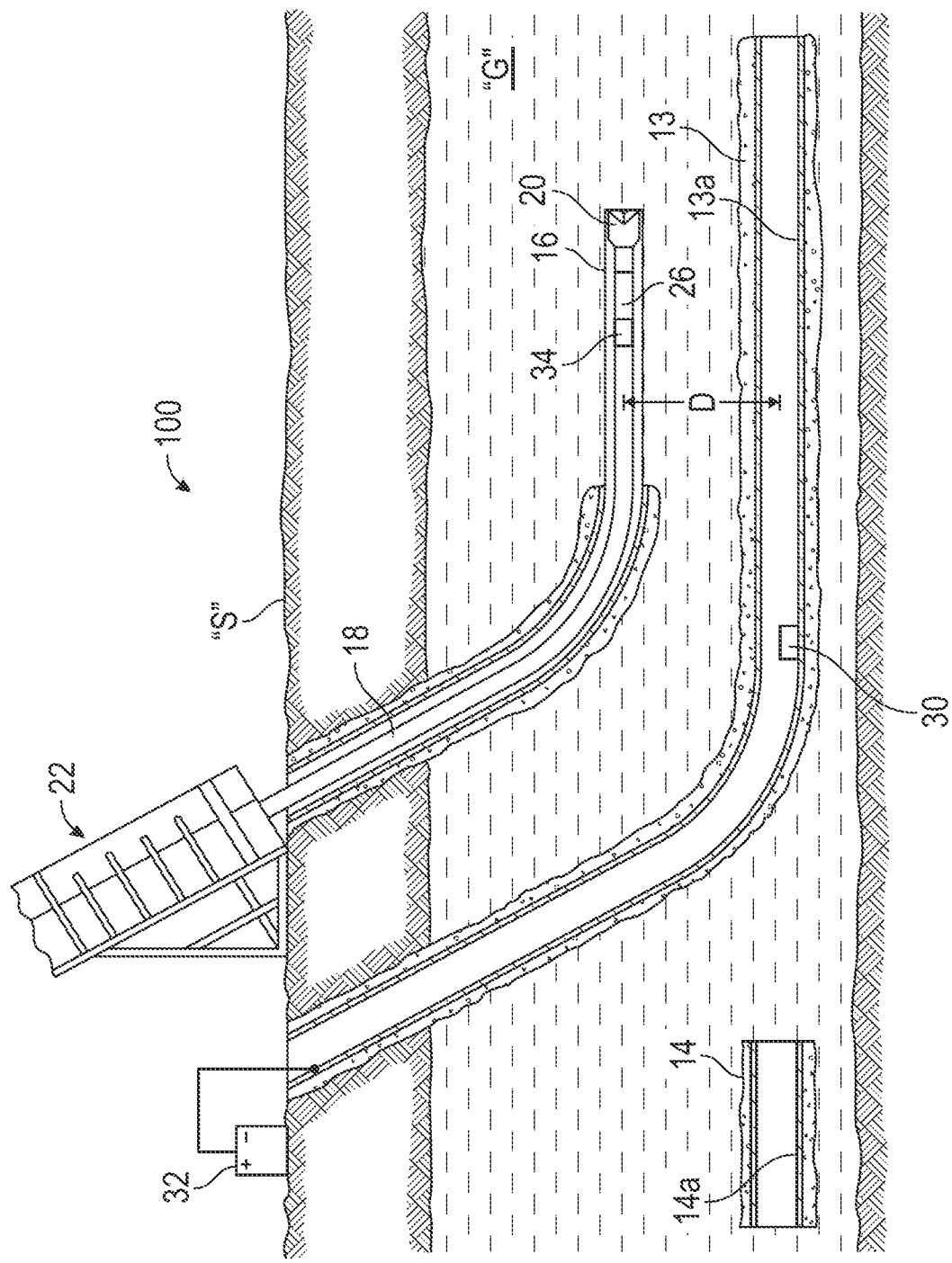
FIG. 10 is a side-view of a system of wellbores including first and second existing wellbores and a third wellbore having a drill string or other conveyance equipped with a ranging tool disposed therein, in accordance with one or more illustrative embodiments of the present disclosure.

FIG. 10 is a side-view of a system of wellbores including first and second existing wellbores and a third wellbore having a drill string or other conveyance equipped with a ranging tool disposed therein, in accordance with one or more illustrative embodiments of the present disclosure. FIG. 10 illustrates a multi-wellbore system 100 including a first wellbore 13 and a second wellbore 14 formed in a geologic formation "G." In some illustrative embodiments, the geologic formation "G" is an oil sand or other heavy oil formation disposed at a relatively shallow depth, e.g., 70-600 m below a surface location "S." The first and second wellbores 13, 14 can be employed for recovery of heavy oil from the geologic formation "G" using processes such as SAGD operations. The systems and methods, in accordance with the teaching herein, can be used to provide SAGD steering, and such SAGD steering can be applied to non-horizontal wells as well. Although the multi-wellbore system 100 is described herein as employed in conjunction with SAGD operations, it should be appreciated that aspects of disclosure may be practiced in conjunction with offshore ranging operations or other types of exploration as well.

The first and second wellbores 13, 14 include respective electrically conductive bodies 13a, 14a therein. The electrically conductive bodies 13a, 14a can include strings of casing pipe, production tubing or other elongate metallic media in which electrical currents can be excited. In various examples discussed herein, wellbore 14 can be considered the ghost well or other interfering source. Electrical currents excited in the electrically conductive bodies 13a, 14a in the first and second wellbores 13, 14 can facilitate magnetic ranging processes for drilling a third wellbore 16 along a path having a predetermined relationship with a path defined by the first wellbore 13. The predetermined relationship can include, e.g., a generally parallel, horizontal relationship to facilitate SAGD operations. By allowing two or more wellbores 13, 16 to be positioned within extremely tight tolerances, magnetic ranging technology eliminates or reduces positional uncertainty of surveys and provides more precise tolerance for SAGD wells. In other embodiments, the predetermined relationship can be an intersecting relationship where the third wellbore 16 intersects the first wellbore 13 at a predetermined and/or true depth, a lateral branching relationship where the third wellbore 16 branches from the first wellbore 13 at a predetermined location.

The first wellbore 13 can be employed as the target or "producer" in a SAGD system and the third wellbore 16 can be employed as the drilling or "injector" in a SAGD system. The third wellbore 16 is being drilled proximate the first wellbore 13 at a distance "D" therefrom. In some example embodiments, the distance "D" can be in the range of about 5 to about 15 meters. The third wellbore 16 is being drilled with a drill string 18 having a drill bit 20 at a lower end thereof. In this example, a slant drilling rig 22 is erected at the surface location "S" to support the drill string 18 at shallow angles, e.g., at angles in the range of about 15° to about 75° from horizontal. In some example embodiments, the slant drilling rig 22 can support the drill string 18 at angles of between 0° and 90° (inclusive) from horizontal. Often slant drilling is employed to facilitate access to the shallow geologic formations "G" where heavy oils are entrapped and SAGD operations are generally conducted.

A ranging tool 26 as described herein is carried by the drill string 18. The ranging tool 26 can be employed to determine the location of the conductive body 13a within the first wellbore 12 according to the illustrative embodiments herein, thus permitting the drill bit 20 to be steered to maintain the third wellbore 16 at the distance "D" from the first wellbore 12, or at any spatial relationship therewith. The ranging tool 26 is operable to detect a magnetic field generated by separate electric currents propagated through electrically conductive bodies 13a, 14a, and measure wellbore parameters of both the first and second wellbores 13, 14 to guide the drill string 18. As previously described, tool 26 may have one or two sensor packs. In some example embodiments, the ranging tool 26 can be deployed independently of a drill string 18. For example, the ranging tool 26 can be deployed into an additional existing wellbore (not shown) by wireline, coiled tubing or other recognized methods.

The electric currents propagated through the conductive bodies 13a, 14a can be excited in any recognized manner, e.g., by using a down-hole electrode source 30, or by directly coupling an electrically conductive body 13a to a current source 32 at the surface location "S." In some example embodiments, the currents can be remotely excited by coil antennas 34 separated a distance from the ranging receiver, which form a part of, or are carried by, the drill string 18.

Figure 11:
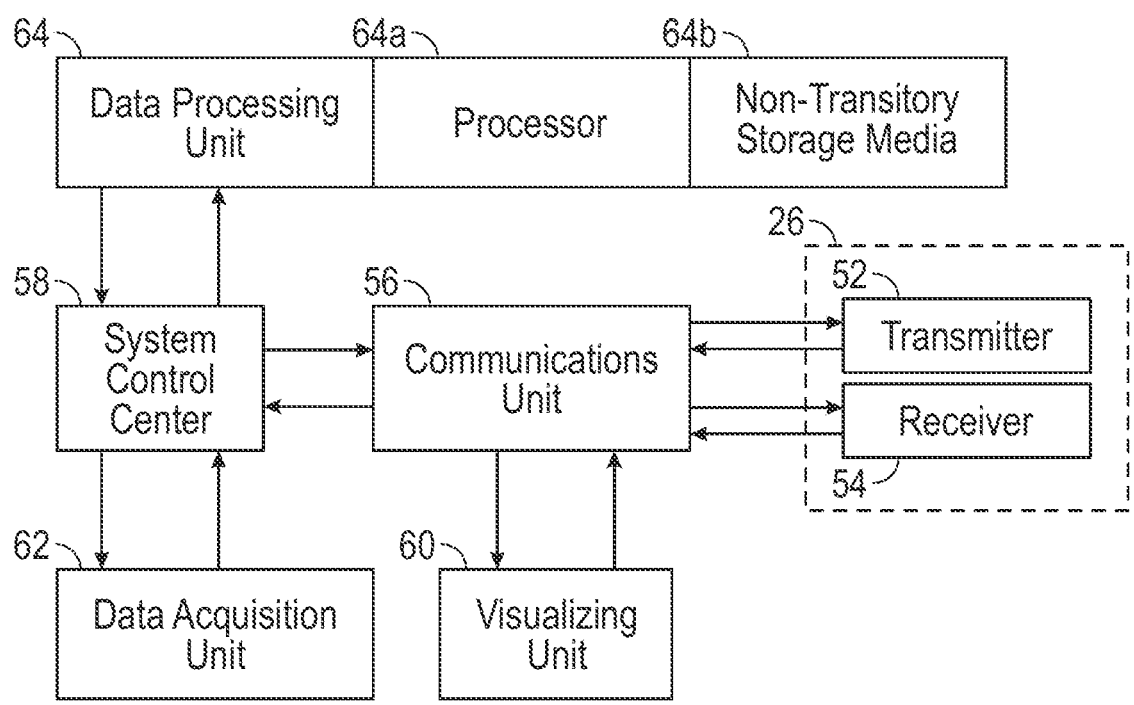
FIG. 11 is a block diagram of a system for performing ranging operations described herein.

Referring to FIG. 11 and with continued reference to FIG. 10, a system 50 for performing ranging operations described herein is illustrated. In this example, the system 50 can include transmitters 52 and receivers 54. In some example embodiments, the transmitters 52 can form a part of the ranging tool 26, and can be carried by a drill string 18. The transmitters 52 can be operable to generate an electromagnetic field/signal that causes current to flow in the electrically conductive bodies 13a, 14a. As used herein, the term "transmitter" can include other such mechanisms for inducing the electric currents in the electrically conductive bodies 13a, 14a such as the electrode 30 and/or current source 32.

The receivers/sensors 54 may include any mechanism that detects, measures and/or collects a magnetic field for processing. For example, coil antennas or magnetometers can be used. The receivers 54 can be operable to measure or collect for processing an electromagnetic field emitted from one or more electrically conductive bodies 16, as a result of the field generated from the transmitters 52. The electrically conductive bodies 13a, 14a, and the wellbores 13, 14 containing the electrically conductive bodies 13a, 14a, can be detected from the magnetic field, and the appropriate locations and other wellbore parameters can be determined therefrom.

The system 50 also includes a communications unit 56, which facilitates interaction among a system control center 58, a visualizing unit 60 and the transmitters 52 and receivers 54. The communications unit 56 can provide a bidirectional telemetry system for communication between down-hole components, e.g., the ranging tool 26, and components located at the surface location "S," e.g., the visualizing unit 60. Communications unit 56 can employ combinations of wired communication technologies and wireless technologies at frequencies that do not interfere with ongoing measurements made by the ranging tool 56. The visualizing unit 60 can include computer monitors, printers or other devices that permit an operator at the surface location "S" to monitor data generated by the system 50. The operator may monitor the data to determine whether intervention into the system 50 is necessary.

The system control center 58 can be disposed within the ranging tool 26, at another down-hole location, or at the surface location "S," and can include a computer with a processor and a non-transitory memory associated therewith. The system control center 58 can manage the generation of transmission signals, e.g., instructions signals for the transmitters 52, and can manage the collection of received signals, e.g., data signals from the receivers 54, corresponding to the transmission signals. The frequency at which the transmission signals are provided can be controlled by the system control center 58. The system control center 58 is also operably coupled to a data acquisition unit 62 and a data processing unit 64. The data acquisition unit 62 can include analog to digital converters, or other mechanisms for converting the received signals into a form useable by the system control center 58 and/or the data processing unit 64.

The data processing unit 64 can convert the received signals into information indicating the number, position and directional characteristics of wellbores in the vicinity of the ranging tool 26 as described herein. This information can be provided to the visualizing unit 60 for evaluation by an operator. In some embodiments, the data processing unit 64 may include a processor 64a and a computer readable medium 64b operably coupled thereto. The computer readable medium 64b can include a nonvolatile or non-transitory memory with data and instructions that are accessible to the processor 64a and executable thereby.

Moreover, those ordinarily skilled in the art will appreciate that various aspects of the disclosure may be practiced with a variety of computer-system configurations, including hand-held devices, multiprocessor systems, microprocessor-based or programmable-consumer electronics, minicomputers, mainframe computers, and the like. Any number of computer-systems and computer networks are acceptable for use with the present disclosure. The disclosure may be practiced in distributed-computing environments where tasks are performed by remote-processing devices that are linked through a communications network. In a distributed-computing environment, program modules may be located in both local and remote computer-storage media including memory storage devices. The present disclosure may therefore, be implemented in connection with various hardware, software or a combination thereof in a computer system or other processing system.

Accordingly, embodiments of the present disclosure described herein provide useful ranging methods to generate 3D magnetic fields and correct non-parallel effects in ranging distance and direction using 3D magnetic field measurements. In addition, sources of interfering magnetic energy (e.g., ghost wells) may be decoupled from ranging solutions using 3D gradient fields. The described methods improve ranging performance by correcting non-parallel conditions that occur during drilling, especially in build section drilling. This phenomenon also introduces uncertainty during the integration of measured-while-drilling ("MWD") surveys and ranging surveys. The described method also decouples interference from nearby wells, especially in re-drill applications.

Embodiments described herein further relate to any one or more of the following paragraphs:

1. A method for downhole magnetic ranging between a first and second wellbore, the method comprising deploying one or more magnetic receivers in a second wellbore positioned adjacent a first wellbore, the magnetic receivers being located on a tool body; emitting magnetic fields from the first wellbore; calculating a range between the first and second wellbores using magnetic fields obtained by the magnetic receivers, wherein the range includes at least one of a distance between the first and second wellbores; or a direction of the first wellbore in relation to the second wellbore; using the magnetic receivers positioned at a first axial position along the second wellbore to obtain a first magnetic field emitted from the first wellbore; using the magnetic receivers positioned at a second axial position along the second wellbore to obtain a second magnetic field emitted from the first wellbore, the second axial position being axially offset from the first axial position, wherein the first and second magnetic fields combine to form a three-dimensional ("3D") magnetic field; and using the 3D magnetic field to correct the range between the first and second wellbores.

2. The method of paragraph 1, wherein correcting the range comprises using the 3D magnetic field, calculating pitch and yaw angles of the second wellbore; and using the pitch and yaw angles, correcting the range between the first and second wellbores.

3. The method of paragraphs 1 or 2, wherein correcting the range further comprises calculating the yaw angle using the first magnetic field; calculating the range using the first and second magnetic fields; modeling the yaw and pitch angles to thereby calculate a predicted ranging error; and correcting the range using the predicted ranging error.

4. The method of any of paragraphs 1-3, wherein obtaining the first and second magnetic fields comprises using a first magnetic receiver pack to obtain the first magnetic field; and using a second magnetic receiver pack to obtain the second magnetic field, the first magnetic receiver pack being axially offset from the second receiver pack along the tool body.

5. The method of any of paragraphs 1-4, wherein obtaining the first and second magnetic fields comprise using a magnetic receiver pack to obtain the first magnetic field at the first axial position; axially moving the magnetic receiver pack to the second axial position; and using the magnetic receiver pack to obtain the second magnetic field at the second axial position.

6. The method of any of paragraphs 1-5, wherein correcting the range comprises calculating a three-dimensional ("3D") gradient field across a first and second magnetic receiver, wherein the first magnetic receiver is positioned at the first axial position at a first tool face angle, wherein the second magnetic receiver is positioned at the second axial position at a second tool face angle different from the first tool face angle; determining a component of the 3D gradient field that is sensitive to an interfering source of magnetic radiation; determining a component of the 3D gradient field that is insensitive to the interfering source; and using the sensitive and insensitive components to decouple the interfering source from the range, thereby correcting the range between the first and second wellbores.

7. A method as defined in any of paragraphs 1-6, wherein the first wellbore is a producer well; and the second wellbore is an injector well, wherein the method is utilized in a Steam Assisted Gravity Drainage operation.

8. A system for downhole magnetic ranging between a first and second wellbore, the system comprising one or more magnetic receivers located along a tool body; and processing circuitry communicably coupled to the magnetic receivers and comprising instructions which, when executed, causes the processing circuitry to perform operations comprising calculating a range between the first and second wellbores using magnetic fields obtained by the magnetic receivers, wherein the range includes at least one of: a distance between the first and second wellbores; or a direction of the first wellbore in relation to the second wellbore; using the magnetic receivers positioned at a first axial position along the second wellbore to obtain a first magnetic field emitted from the first wellbore; using the magnetic receivers positioned at a second axial position along the second wellbore to obtain a second magnetic field emitted from the first wellbore, the second axial position being axially offset from the first axial position, wherein the first and second magnetic fields combine to form a three-dimensional ("3D") magnetic field; and using the 3D magnetic field to correct the range between the first and second wellbores.

9. The system of paragraph 8, wherein correcting the range comprises using the 3D magnetic field, calculating pitch and yaw angles of the second wellbore; and using the pitch and yaw angles, correcting the range between the first and second wellbores.

10. The system of paragraph 8 or 9, wherein correcting the range further comprises calculating the yaw angle using the first magnetic field; calculating the range using the first and second magnetic fields; correcting the range calculated from the first and second magnetic fields using the yaw angle; calculating the pitch angle from the corrected range; modeling the yaw and pitch angles to thereby calculate a predicted ranging error; and correcting the range using the predicted ranging error.

11. The system of any of paragraphs 8-10, wherein obtaining the first and second magnetic fields comprises using a first magnetic receiver pack to obtain the first magnetic field; and using a second magnetic receiver pack to obtain the second magnetic field, the first magnetic receiver pack being axially offset from the second receiver pack along the tool body.

12. The system of any of paragraphs 8-11, wherein obtaining the first and second magnetic fields comprise using a magnetic receiver pack to obtain the first magnetic field at the first axial position; axially moving the magnetic receiver pack to the second axial position; and using the magnetic receiver pack to obtain the second magnetic field at the second axial position.

13. The system of any of paragraphs 8-12, wherein correcting the range comprises calculating a three-dimensional ("3D") gradient field across a first and second magnetic receiver, wherein the first magnetic receiver is positioned at the first axial position at a first tool face angle, wherein the second magnetic receiver is positioned at the second axial position at a second tool face angle different from the first tool face angle; determining a component of the 3D gradient field that is sensitive to an interfering source of magnetic radiation; determining a component of the 3D gradient field that is insensitive to the interfering source; and using the sensitive and insensitive components to decouple the interfering source from the range, thereby correcting the range between the first and second wellbores.

14. A method for downhole magnetic ranging between a first and second wellbore, the method comprising calculating a range between a first and second wellbore using magnetic fields emitted from the first wellbore; obtaining a three-dimensional ("3D") magnetic field by combining magnetic fields obtained at different axial positions along the second wellbore; and correcting the range using the 3D magnetic field.

15. The method of paragraph 14, wherein the range is corrected using a pitch or yaw angle of the second wellbore.

16. The method of paragraphs 14 or 15, wherein correcting the range further comprises modeling the yaw or pitch angles to thereby calculate a predicted ranging error; and correcting the range using the predicted ranging error.

17. The method of any of paragraphs 14-16, wherein correcting the range comprises calculating a three-dimensional ("3D") gradient field across first and second magnetic receivers positioned at different tool face angles; and using the 3D gradient field to correct the range between the first and second wellbores.

18. The method of any of paragraphs 14-17, wherein obtaining the 3D magnetic field comprises using a first magnetic receiver pack to obtain a first magnetic field; and using a second magnetic receiver pack to obtain a second magnetic field, the first magnetic receiver pack being axially offset from the second receiver pack along a tool body.

19. The method of any of paragraphs 14-18, wherein obtaining the 3D magnetic field comprises using a magnetic receiver pack to obtain a first magnetic field at a first axial position along the second wellbore; axially moving the magnetic receiver pack to a second axial position; and using the magnetic receiver pack to obtain a second magnetic field at the second axial position.

20. The method as defined in any of paragraphs 14-19, wherein a Steam Assisted Gravity Drainage operation is performed using the corrected range.

21. A method for downhole magnetic ranging between a first and second wellbore, the method comprising deploying one or more magnetic receivers in a second wellbore positioned adjacent a first wellbore and an interfering source of magnetic fields; using the receivers to measure magnetic fields being emitted from the first wellbore, the receivers measuring the magnetic fields at different axial positions along the second wellbore to form a three-dimensional ("3D") magnetic field; measuring a 3D gradient field across a first and second magnetic receiver positioned at different tool face angles; comparing the 3D gradient field to a modeling prediction; and using the comparison to determine a range between the first and second wellbore.

22. The method of paragraph 21, wherein comparing the 3D gradient field comprises selecting components of the 3D gradient field which are sensitive and insensitive to the interfering source; searching a modeling response library to select a match of the insensitive and sensitive components; decoupling the interfering source from a ranging calculation using the matching insensitive and sensitive components; and calculating a range between the first and second wellbore using the decoupled range calculation.

23. The method of paragraphs 21 or 22, wherein the modeling response library is created by modeling a target well and drilling well to generate a first response library of ranging calculations estimated from a planned drilling path; and modeling the target well, drilling well, and the interfering source to generate a second response library of the ranging calculations estimated from the planned drilling path.

Moreover, the methods described herein may be embodied within a system comprising processing circuitry to implement any of the methods, or a in a computer-program product comprising instructions which, when executed by at least one processor, causes the processor to perform any of the methods described herein.

Although various embodiments and methodologies have been shown and described, the disclosure is not limited to such embodiments and methods and will be understood to include all modifications and variations as would be apparent to one skilled in the art. For example, the relative positioning methods described herein may be utilized to locate other objects downhole, such as, for example vertical wells or branches of an injector or producer well. Therefore, it should be understood that the disclosure is not intended to be limited to the particular forms disclosed. Rather, the intention is to cover all modifications, equivalents and alternatives falling within the spirit and scope of the disclosure as defined by the appended claims.

What is claimed is:

1. A method for downhole magnetic ranging between a first and second wellbore, the method comprising:
    deploying a first azimuthally deployed magnetic receiver array and a second azimuthally deployed magnetic receiver array in a second wellbore positioned adjacent a first wellbore;
    emitting magnetic fields from the first wellbore;
    calculating a range between the first and second wellbores using magnetic fields obtained by the first and the second azimuthally deployed magnetic receiver arrays, wherein the range includes at least one of:
        a distance between the first and second wellbores; or
        a direction of the first wellbore in relation to the second wellbore;
    using the first azimuthally deployed magnetic receiver array to obtain a first magnetic field emitted from the first wellbore, wherein the first azimuthally deployed magnetic receiver array is positioned at a first axial position along the second wellbore;
    using the second azimuthally deployed magnetic receiver array to obtain a second magnetic field emitted from the first wellbore, wherein the a second azimuthally deployed magnetic receiver array is positioned at a second axial position along the second wellbore, and wherein the second axial position being axially offset from the first axial position;
    calculating a three-dimensional ("3D") gradient field across the first axial position and the second axial position; and
    using the 3D magnetic gradient field to correct the range between the first and second wellbores.

2. The method of claim 1, wherein correcting the range comprises:
    using the 3D magnetic field, calculating pitch and yaw angles of the second wellbore; and using the pitch and yaw angles, correcting the range between the first and second wellbores.

3. The method of claim 2, wherein correcting the range further comprises: calculating the yaw angle using the first magnetic field; calculating the range using the first and second magnetic fields; modeling the yaw and pitch angles to thereby calculate a predicted ranging error; and correcting the range using the predicted ranging error.

4. The method of claim 1, wherein obtaining the first and second magnetic fields comprises: using the first azimuthally deployed magnetic receiver array to obtain the first magnetic field; and using the second azimuthally deployed magnetic receiver array to obtain the second magnetic field, the first azimuthally deployed magnetic receiver array being axially offset from the second azimuthally deployed magnetic receiver array along the tool body.

5. The method of claim 1, wherein obtaining the first and second magnetic fields comprise: using the first azimuthally deployed magnetic receiver array to obtain the first magnetic field at the first axial position; axially moving the first azimuthally deployed magnetic receiver array to the second axial position; and using the first azimuthally deployed magnetic receiver array to obtain the second magnetic field at the second axial position.

6. The method of claim 1, wherein the first azimuthally deployed magnetic receiver array is positioned at the first axial position, wherein the second azimuthally deployed magnetic receiver array is positioned at the second axial position; determining a first component of the 3D gradient field from a first receiver from the first azimuthally deployed magnetic receiver array at a first tool face angle and a second receiver from the second azimuthally deployed magnetic receiver array at a second tool face angle, wherein the first and second tool face angles are different; determining a sensitive component of the 3D gradient field that is sensitive to an interfering source of magnetic radiation, wherein the interfering source is from a third well; determining an insensitive component of the 3D gradient field that is insensitive to the interfering source; and using the sensitive and insensitive components to decouple the interfering source from the range, thereby correcting the range between the first and second wellbores.

7. A method of claim 6, wherein: the first wellbore is a producer well; the second wellbore is an injector well, wherein the second well is configured to utilize a Steam Assisted Gravity Drainage operation; and the third well is an injector well.

8. A system for downhole magnetic ranging between a first and second wellbore, the system comprising:
    a first azimuthally deployed magnetic receiver array and a second azimuthally deployed magnetic receiver array; and
    processing circuitry communicably coupled to the first and the second azimuthally deployed magnetic receiver arrays and comprising instructions which, when executed, causes the processing circuitry to perform operations comprising:
        calculating a range between the first and second wellbores using magnetic fields obtained by the first and the second azimuthally deployed magnetic receiver arrays, wherein the range includes at least one of:
            a distance between the first and second wellbores; or
            a direction of the first wellbore in relation to the second wellbore;
        using the first azimuthally deployed magnetic receiver array positioned at a first axial position along the second wellbore to obtain a first magnetic field emitted from the first wellbore;
        using the second azimuthally deployed magnetic receiver array positioned at a second axial position along the second wellbore to obtain a second magnetic field emitted from the first wellbore, the second axial position being axially offset from the first axial position, wherein the first and second magnetic fields combine to form a three-dimensional ("3D") magnetic field;
        calculating a three-dimensional ("3D") gradient field across the first axial position the second axial position; and using the 3D gradient field to correct the range between the first and second wellbores.

9. The system of claim 8, wherein correcting the range comprises: using the 3D magnetic field, calculating pitch and yaw angles of the second wellbore; and using the pitch and yaw angles, correcting the range between the first and second wellbores.

10. The system of claim 9, wherein correcting the range further comprises: calculating the yaw angle using the first magnetic field; calculating the range using the first and second magnetic fields; correcting the range calculated from the first and second magnetic fields using the yaw angle; calculating the pitch angle from the corrected range; modeling the yaw and pitch angles to thereby calculate a predicted ranging error; and correcting the range using the predicted ranging error.

11. The system of claim 8, wherein obtaining the first and second magnetic fields comprises: using the first azimuthally deployed magnetic receiver array to obtain the first magnetic field; and using the second azimuthally deployed magnetic receiver array to obtain the second magnetic field, the first magnetic receiver pack being axially offset from the second azimuthally deployed magnetic receiver array along the tool body.

12. The system of claim 8, wherein obtaining the first and second magnetic fields comprise: using the first azimuthally deployed magnetic receiver array to obtain the first magnetic field at the first axial position; axially moving the magnetic receiver pack to the second axial position; and using the first azimuthally deployed magnetic receiver array to obtain the second magnetic field at the second axial position.

13. The system of claim 8, wherein the first azimuthally deployed magnetic receiver array is positioned at the first axial position at a first tool face angle, wherein the second azimuthally deployed magnetic receiver array is positioned at the second axial position at a second tool face angle different from the first tool face angle; determining a component of the 3D gradient field that is sensitive to an interfering source of magnetic radiation; determining a component of the 3D gradient field that is insensitive to the interfering source; and using the sensitive and insensitive components to decouple the interfering source from the range, thereby correcting the range between the first and second wellbores.

14. A method for downhole magnetic ranging between a first and second wellbore, the method comprising:
calculating a range between a first and second wellbore using magnetic fields emitted from the first wellbore;
obtaining a three-dimensional ("3D") magnetic field by combining magnetic fields obtained at different axial positions along the second wellbore;
calculating a three-dimensional ("3D") gradient field across at least two different positions from the different axial positions along the second wellbore; and
correcting the range using the 3D magnetic field.

15. The method of claim 14, wherein the range is corrected using a pitch or yaw angle of the second wellbore.

16. The method of claim 15, wherein correcting the range further comprises: modeling the yaw or pitch angles to thereby calculate a predicted ranging error; and correcting the range using the predicted ranging error.

17. The method of claim 14, wherein correcting the range comprises: calculating a three-dimensional ("3D") gradient field across first and second magnetic receivers positioned at different tool face angles; and using the 3D gradient field to correct the range between the first and second wellbores.

18. The method of claim 14, wherein obtaining the 3D magnetic field comprises: using a first magnetic receiver pack to obtain a first magnetic field; and using a second magnetic receiver pack to obtain a second magnetic field, the first magnetic receiver pack being axially offset from the second receiver pack along a tool body.

19. The method of claim 14, wherein obtaining the 3D magnetic field comprises: using a magnetic receiver pack to obtain a first magnetic field at a first axial position along the second wellbore; axially moving the magnetic receiver pack to a second axial position; and using the magnetic receiver pack to obtain a second magnetic field at the second axial position.

20. The method as defined in claim 14, wherein a Steam Assisted Gravity Drainage operation is performed using the corrected range.

* * * * *